Sept. 1, 1936. H. J. CRABBS Re. 20,085
DISCONNECTING SWITCH
Original Filed Feb. 6, 1929 3 Sheets-Sheet 1
Fig. 1.
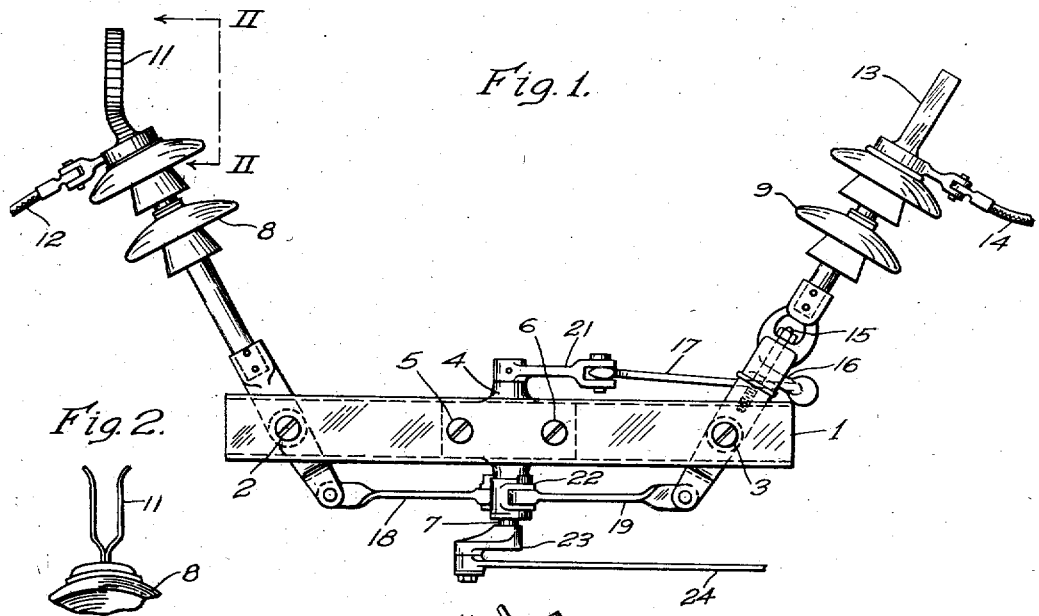
Fig. 2.
Fig. 3.
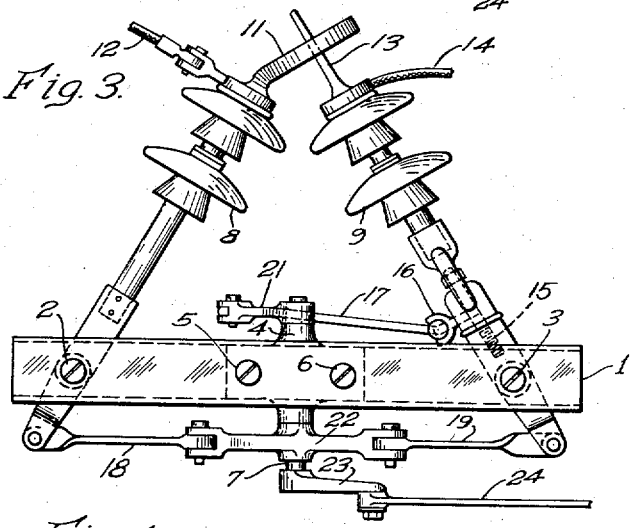
Fig. 4.
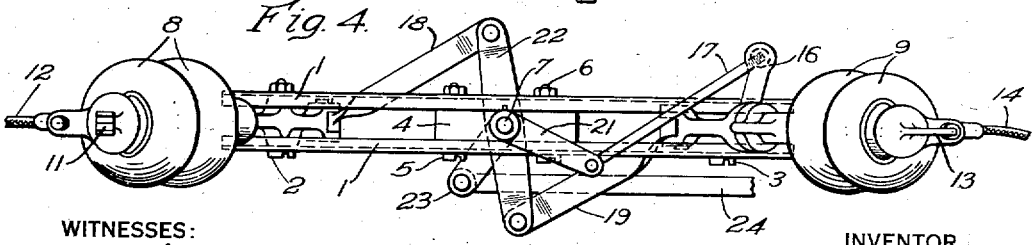
WITNESSES:
C. J. Weller.
Paul J. Glaister
INVENTOR
Herbert J. Crabbs.
BY F. W. Seyle.
ATTORNEY Sept. 1, 1936. H. J. CRABBS Re. 20,085

DISCONNECTING SWITCH

Original Filed Feb. 6, 1929 3 Sheets-Sheet 2

WITNESSES:

C. J. Weller.

Paul J. Blaister

INVENTOR

Herbert J. Crabbs.

BY F. W. Lyle

ATTORNEY

Sept. 1, 1936. H. J. CRABBS Re. 20,085

DISCONNECTING SWITCH

Original Filed Feb. 6, 1929 3 Sheets-Sheet 3

WITNESSES:

C. J. Weller.

Paul J. Blaisler

INVENTOR

Herbert J. Crabbs.

BY F. W. Lyle,

ATTORNEY

Reissued Sept. 1, 1936

Re. 20,085

UNITED STATES PATENT OFFICE 20,085

DISCONNECTING SWITCH

Herbert J. Crabbs, Wilkinsburg, Pa., assignor to Westinghouse Electric & Manufacturing Company, a corporation of Pennsylvania Original No. 1,817,065, dated August 4, 1931, Serial No. 337,829, February 6, 1929. Application for reissue August 3, 1933, Serial No. 683,537

40 Claims. (Cl. 200—48)

My invention relates to switch mechanisms and particularly to disconnecting switches for high voltage circuits.

One object of my invention is to provide a pair of insulating members for a switch of the above-mentioned type that shall be so supported as to permit a tilting movement to engage and separate the contact members thereof.

Heretofore it has been the practice to provide high voltage disconnecting switches with a pair of vertical insulating members to support a contact jaw and a cooperating blade, respectively. The demand for switches of greater current and voltage finds this type of structure inadequate as the cantilever strain on the insulators, the spacing of which must necessarily be increased, becomes prohibitive and other structures must be employed.

Accordingly, I have provided a pair of tilting insulating members, that may be of considerable length, supported for a tilting movement on either side of their vertical positions, such movement being sufficient to effectively interrupt the high voltage circuit. The contacts employed on the insulators have a high pressure engagement brought about through the rotation of one or both of the insulators after they have been tilted into their contact engaging positions.

It is a property of the ceramic materials usually employed for high voltage insulators in outdoor service that, while capable of withstanding considerable compressive and torsional stresses, they are relatively weak under tension and cantilever stresses. A pair of tilting insulator columns are accordingly but poorly adapted to force a blade and a contact jaw located on their respective ends, into an engagement of the degree of tightness necessary for satisfactory operation of a switch. On the other hand, since even a long column of ceramic insulators is well adapted to exert considerable torsional forces, it is possible to obviate the above-described difficulty from inability to withstand cantilever stress by employing, in combination with switches of the character herein described, contacts which produce high contact pressures through rotative engagement.

It is, therefore, another object of my invention to provide a switch of the above-mentioned type with an operating mechanism that rotates one or both of the insulators after first tilting them until the contacts thereof come into the engagement position.

A further object of my invention is to provide a switch having tilting and rotating movement with a pair of lever systems connected to a single operating member and so arranged that one lever system tilts the insulators and the other lever system, thereafter, rotates the contact members.

With these principles and objects in mind, my invention will best be understood by referring to the following description and drawings wherein:

Figure 1 is a view in elevation of a switch structure embodying my invention and shown in open position;

Fig. 2 is an end view in elevation of the bifurcated contact shown in Fig. 1;

Fig. 3 is a view in elevation similar to that of Fig. 1, with the exception that the parts are shown in the closed position;

Fig. 4 is a plan view of Fig. 1 with the circuit interrupter shown in open position;

Figure 5:
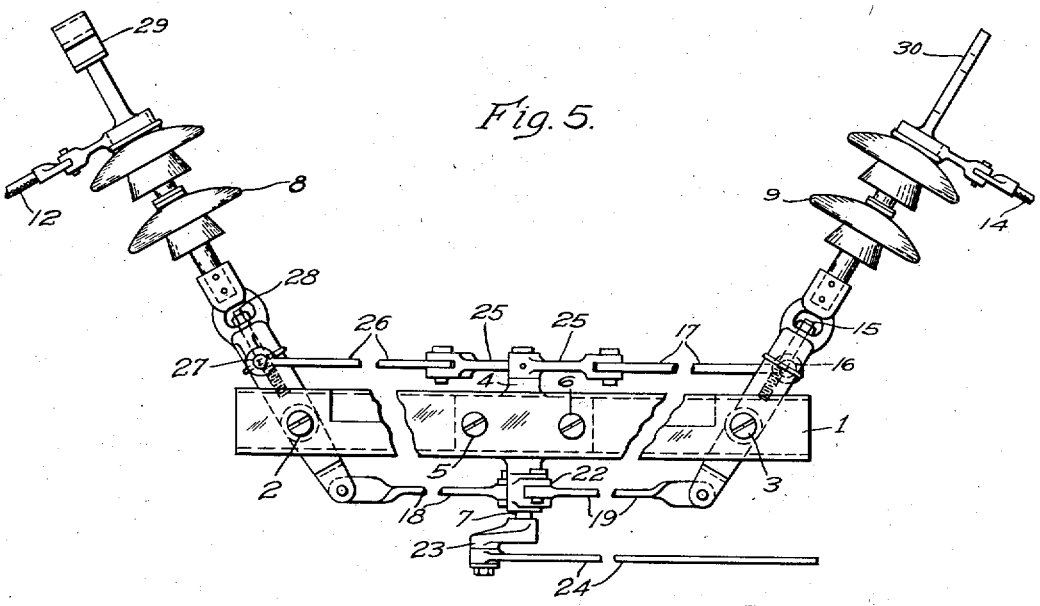
Fig. 5 is a fragmentary view, in elevation, of a switch structure embodying a modified form of my invention, shown in the open position.

My invention comprises, in general, the arrangement shown in Fig. 1. The entire switch mechanism is mounted on channels or base members 1 which are provided with pivot pins 2 and 3, for supporting the tilting insulators. One of the two cooperating contact members is mounted on each of the two tilting insulators. The bearing 4, which is employed to journal the switch operating shaft 7, is supported on the base 1 by means of two bolts 5 and 6.

Insulating columns 8 and 9 are mounted on the pivot pins 2 and 3, respectively, the insulating column 8 supporting on its upper end a switch member having a bifurcated or jaw contact 11 that is connected, by means of the flexible connector 12, to the main line circuit. The insulator column 9 supports, on its upper end, a switch member having a contact blade or tongue 13 which is electrically connected by means of the flexible conductor 14, to the other side of the main line circuit. The distance between the bifurcated contact 11 and the blade contact 13 when separated should be such as to be proportional to the voltage rating of the switch, since the flexible conductors are the means of connecting the main lines to the contacts, the supporting structure being insulated therefrom by the columns 8 and 9.

Between the supporting pin 3 and the base of the insulating column 9, a pin 15 is provided upon which the insulating column 9 may rotate. An arm 16 extends from the side of the base of the insulating column 9 and has a loose swivel connection with a link 17 associated therewith. The pivotal support members for the insulating columns 8 and 9 extend below the pins 2 and 3 and are pivotally connected to links 18 and 19, by means of which the tilting movement of the insulating columns 8 and 9 is obtained.

The shaft 7 has pinned thereto a single crank arm 21, a double crank arm 22 and a second single crank arm 23, the latter being connected to a link 24 that transmits a force to rotate the shaft 7. Links 18 and 19 are connected to the double-arm 22 while the link 17 is connected to the arm 21.

The double arm 22, the single arm 21 and the extension 16 have such relative positions and length that the first movement of rotation of the shaft 7 imparts very little or no movement of rotation to the insulating column 9 but does impart a large movement to the links 18 and 19 to tilt the insulator columns 8 and 9 toward each other. During this time, the crank arm 21 is moving in an arc in a manner to be approximately proportional to the movement of the extension 16 in an arc about the pivot 3.

After the tilting movement has been completed, the continued rotation of the shaft 7 moves the double crank 22 up to and beyond the toggle position of the links 18 and 19, thereafter producing very little, if any, tilting movement to the insulator columns 8 and 9. During this latter movement, the crank arm 21 has revolved, with the crank arm 22, a distance sufficient to cause the extension 16 to rotate, carrying the insulator column 9 therewith, so that the blade 13 is rotated in such a manner as to produce a high pressure engagement with the bifurcated jaw 11. The closed position of the blade and jaw and of the cranks and the levers is that shown in Fig. 3 of the drawings.

The opening operation of the switch takes place in the reverse order from that just described. The insulating column 9 rotates at first to disengage the contacts while the crank 22 is moving over its center position and the movement thereafter tilts the members 8 and 9 away from each other into the positions shown in Figs. 1 and 4 of the drawings.

Figure 6:
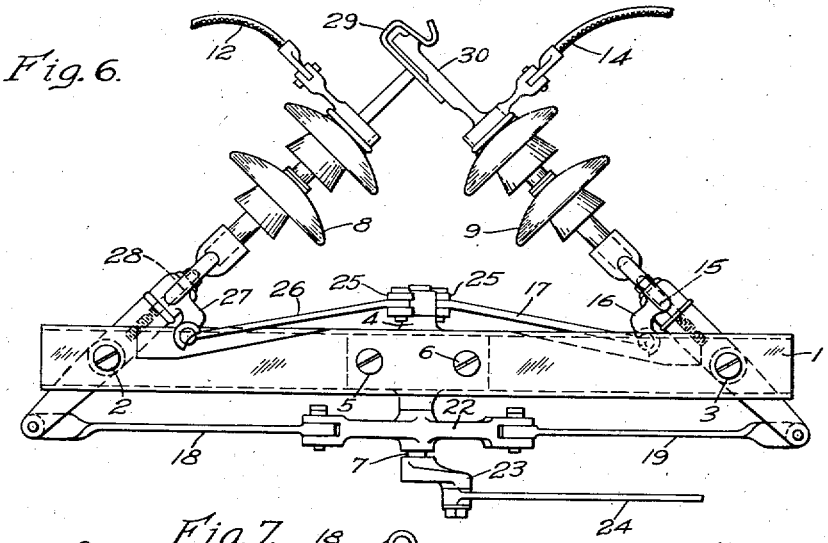
Fig. 6 is a view, in elevation, similar to that of Fig. 5, with the exception that the parts are shown in the closed positions.
Figure 7:
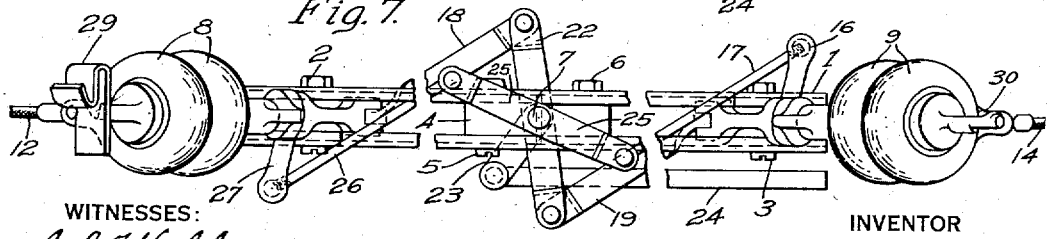
Fig. 7 is a plan view of the structure shown in Fig. 5.

It is to be understood that by employing a double arm 25 in place of the arm 21 as illustrated in Figs. 5, 6 and 7, and providing column 8 with a duplication of the linkage system associated with column 9 and comprising link 26, extension 27 and a pin 28, the column 8 may be rotated at the same time as the column 9. This construction permits the bringing of contact members 29 and 30 into high pressure engagement with a smaller angular movement of the insulating columns or as illustrated in Figs. 5, 6 and 7 a greater rubbing engagement between the contact members may ensue. It is also to be understood that when the single insulating column is rotated it may either support the bifurcated member or the blade member, as the high pressure engagement therebetween may be obtained through the rotation of either of the contact members.

It will also be noted that the arms 21 and 25 may be located below the base member, attached to the pin 15 when extended therethrough, in order to provide a structure having all of the links and levers close together so that they may be enclosed by a simple structure to protect them from ice and sleet.

Figure 8:
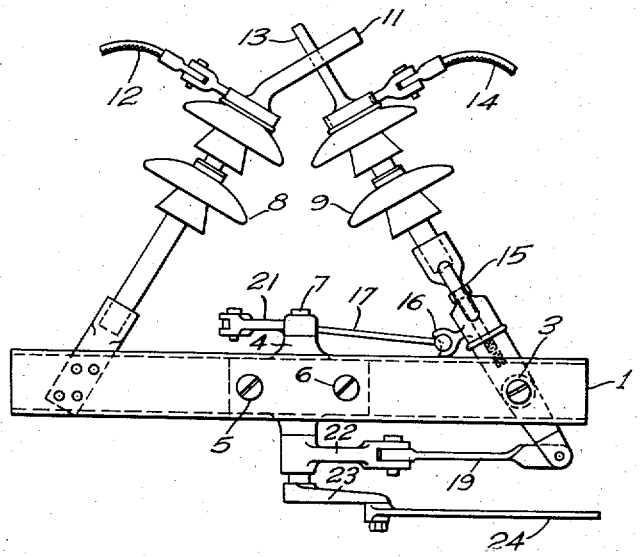
Fig. 8 is a view, in elevation, of a switch structure embodying a second modified form of my invention, shown in the closed position; and, Fig. 9 is a view, in elevation, of a switch structure embodying a further modified form of my invention shown in the closed position.
Figure 9:
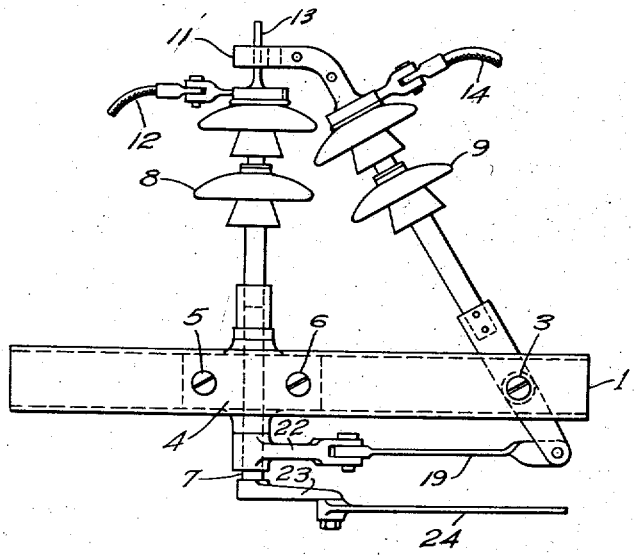

Under certain conditions, it may be advisable to mount the insulating column 8 directly on the shaft 7 as shown in Fig. 9 and tilt the other insulator while the first insulator is being rotated. Such a construction permits the tongue or blade contact member 13 which is then mounted on the insulator 8 to be rotated during the first part, of the movement at the time the contact jaw 11 mounted on the tilting insulator 9 is being moved into engagement therewith. After the engagement of the contacts, the crank arm 22 would thereafter move to and beyond the toggle position with the link 19 and apply no further tilting movement to the insulating column 9 while the insulating column 8 would then be completing its movement of rotation. The same result will also be achieved by mounting one insulator in fixed position and tilting and rotating the other column as shown in Fig. 8.

It will thus be seen that I have provided a switch for high voltage operation in which the cantilever stresses that heretofore limited the size of the structure, have been eliminated by employing large insulating columns that are moved only a short distance on either side of their vertical position. My invention is further novel in providing a switch comprising tilting insulating columns having contact terminals that effect high-pressure engagement through the rotation of one or both of the insulator columns after being tilted into engagement.

The lever system, employed to obtain the tilting and rotating movement of the insulator columns, is actuated from a common source and the two movements that are obtained in sequence are made possible by having each lever system pass over toggle position while the other lever system is applying a force to the columns.

It will be understood that many modifications, changes, additions and substitutions, may be made therein without departing from the spirit and scope of my invention. I therefore, desire that the appended claims be limited only in the respects imposed by the prior art.

I claim as my invention:

1. In a switch structure, a pair of insulators pivoted for a tilting movement, an operating mechanism associated with the insulators to tilt the insulators in opposite directions simultaneously, a switch jaw on one insulator, a cooperating contact on a second insulator, and means for rotating one of the insulators after the contact of the latter has been moved into engagement with the jaw.

2. A switch structure including a jaw and a cooperating contact, a pair of insulators pivoted for tilting movement and supporting the contact and the jaw, the insulator supporting the contact being adapted for rotative movement and means for tilting the insulator until the contact engages the jaw and to thereafter rotate the insulator and contact.

3. A switch structure including a jaw and a cooperating blade, a pair of insulators pivoted for tilting movement and supporting the blade and the jaw, one of the insulators being constructed for rotative movement and means for tilting the insulators until the blade and jaw engage and thereafter to rotate the one said insulator to bring the jaw and the blade into intimate engagement.

4. A switch structure including a jaw and a cooperating contact, a pair of insulators supporting the contact and the jaw and pivoted for tilting movement, a second pivot associated with the insulators upon which they may rotate and operating means for tilting the insulators until the contact engages the jaw and for thereafter rotating the insulators to force the contact and the jaw into more intimate engagement.

5. A switch structure, including a cooperating contact and a jaw, two insulators, one supporting the contact, the other supporting the jaw, pivot means for supporting the insulators for tilting movement, a second pivot means associated with each insulator for permitting them to rotate and means for tilting the insulators until the contact engages the jaw and for thereafter rotating the insulators to bring the said contact and jaw into high pressure engagement.

6. In an operating mechanism for a pair of insulators, that have a tilting and rotative movement, a toggle lever system for tilting the insulator, a second toggle lever system that passes over center position during the time the insulators are being tilted and that rotates the insulator thereafter while the first said lever system is passing over its center position.

7. A pair of toggle lever systems actuated by a common member to impart a rotative and a tilting movement to a switch member, the one lever system producing the tilting movement while the second lever system is moving over its center position, and the first said lever system is moving over its center position while the second lever system is rotating the said member.

8. A switch mechanism having a blade and a jaw, an insulating member pivoted for a rotative movement, a second insulator supported for a tilting movement, one of said insulators supporting said blade and the other supporting said jaw, and a lever system for first tilting the one insulator and thereafter rotating the other insulator so that the blade and jaw are moved into intimate engagement.

9. A switch mechanism having a contact and a jaw, an insulating member pivoted for a rotative movement, a second insulator supported for a tilting movement, one insulator supporting said contact, the other insulator supporting said jaw, and an interconnected lever system that rotates the one insulator while the other is tilted, and firmly engages said contact with said jaw by continued rotation thereafter.

10. A switch mechanism having separable contact members for completing an electrical circuit, a pair of ceramic insulating members each supporting one of the separable contact members, means for supporting one of the insulating members for an arcuate and rotative movement and operating means for the said one insulator to first tilt it until the contact members come into engagement and thereafter to rotate it to provide a high pressure engagement for the said contact members.

11. The combination in a switch structure, of a pair of insulators pivoted for a tilting movement, an operating mechanism associated with the insulators to tilt the insulators in opposite directions simultaneously, a switch jaw on one insulator, a cooperating contact on a second insulator, and means for rotating one of the insulators after the latter has been moved into engagement with the jaw.

12. A switch mechanism having a contact and a jaw, independent insulating members for their support, two pivots associated with one of said insulating members, and operating mechanism for tilting said insulating member about one of said pivots and for rotating it thereafter about the other pivot.

13. A switch mechanism having a contact and a jaw, an insulating member pivoted for a rotative movement, a second insulating member supported for a tilting movement, one insulating member supporting said contact, the other insulating member supporting said jaw and an operating mechanism for tilting one insulating member and for rotating the other insulating member in order that the contact and jaw shall become firmly engaged.

14. In an electric switch, a rotatable insulator, a contact tongue mounted thereon and rotatable therewith, the axis of rotation of said insulator passing between the opposed sides of said contact tongue, a contact jaw, means for moving said contact jaw into and out of engagement with said contact tongue to open and to close the circuit, and means for rotating said insulator and said contact tongue following the engagement of said contact tongue by said contact jaw during the circuit closing operation to cause more intimate engagement between the contacting surfaces of said contact tongue and said contact jaw.

15. In an electric switch, a rotatable insulator a conducting means mounted thereon and rotatable therewith, said conducting means having contact portions on opposite sides of the axis of rotation of said rotatable insulator, a second conducting means, means for moving said second conducting means into and out of engagement with said first conducting means to open and to close the circuit, and means for rotating said insulator and said first conducting means during at least a portion of the circuit closing operation to cause more intimate engagement between the contacting surface of said first and said second conducting means.

16. In an electric switch, a rotatable insulator, a conducting means supported thereon, a second conducting means, means for moving said second conducting means into and out of engagement with said first conducting means to open and to close the circuit, said second conducting means moving in a plane which is substantially parallel to the axis of rotation of said rotatable insulator, and means for rotating said insulator and said first conducting means mounted thereon following the engagement of said second conducting means therewith during the circuit closing operation to cause more intimate engagement between the contacting surfaces of said first conducting means and said second conducting means.

17. In an electric switch, a rotatable insulator, a conducting means supported thereon, a switch member, means for moving said switch member into and out of engagement with said conducting means to open and to close the circuit, said switch member moving in a plane which is substantially parallel to the axis of rotation of said rotatable insulator, and means for rotating said insulator and said conducting means mounted thereon following the engagement of said conducting means and said switch member during the circuit closing operation to cause more intimate engagement between the contacting surfaces of said switch member and said conducting means.

18. In an electric switch, a conducting means including a contact jaw, a blade means for cooperating therewith to open and to close the circuit, means supporting said conducting means for movement into and out of engagement with said blade means, the longitudinal axes of the opposed side portions of said jaw being substantially perpendicular to the longitudinal axis of said blade when said switch is in the closed circuit position, and means for rotating said blade means following the engagement of said contact jaw and said blade means during the circuit closing operation to cause more intimate engagement between the contacting surfaces of said blade means and said contact jaw.

19. In an electric switch, a switch member, a pair of insulators, conducting means supported on each of said insulators, one of said conducting means having a contact tongue and the other of said conducting means supporting said switch member and having a contact jaw on the end of said switch member which cooperates with said contact tongue to open and to close the circuit, said switch member having a length substantially equal to the distance separating said conducting means when said switch is in the closed circuit position, means for moving said switch member into and out of engagement with said contact tongue to open and to close the circuit, the insulator on which said contact tongue is supported being rotatable, said switch member moving in a plane which is substantially parallel to the axis of rotation of said rotatable insulator, and means for rotating said rotatable insulator and said contact tongue during the circuit closing operation to cause more intimate engagement between the contacting surfaces of said switch member and said contact tongue.

20. In a vertical break electric switch, a stationary insulator, a contact means supported thereon, a second insulator, a blade member supported thereon for swingable movement into and out of engagement with said stationary contact means to open and to close the circuit, and means for causing rotation of said second supporting insulator when said blade member has engaged said stationary contact means during the circuit closing operation, said rotation of said second supporting insulator causing rotation of the entire blade member and thereby effecting a more intimate engagement between the cooperating contact portions of said contact means and said blade member.

21. In an electric switch having only two insulators, a stationary insulator, a contact jaw supported on said stationary insulator, a blade member supported on a second insulator and movable into and out of engagement with said stationary contact jaw and means for rotating said second insulator to cause rotation of the entire blade member when said blade member engages said stationary contact jaw to cause intimate engagement between the cooperating contact portions of said jaw and said blade member.

22. In an electric switch, a rotatable insulator, a contact means mounted on said rotatable insulator and including contact surfaces on opposite sides of the axis of rotation of said insulator, a cooperating contact means having contact portions for engaging said contact surfaces when said switch is in the closed circuit position, and operating means for said switch, including means actuable during the circuit opening operation to rotate said contact means to loosen the engagement between said contact surfaces and said contact portions, and then to move said cooperating contact means to the open circuit position.

23. In an electric switch, a switch member, support means therefor which permits said switch member to be swingably moved to the open circuit and to the closed circuit position, a contact means adapted to be engaged by the free end of said switch member, and operating means for said switch member including means, actuable during the circuit opening operation, for rotating said contact means to loosen its engagement with the free end of the switch member while the switch member is maintained substantially stationary and then swingably moving the switch member away from said contact means.

24. In an electric switch, a movable switch member means having a contact portion adjacent one end thereof, a contact means adapted to be engaged by said contact portion when said switch member is in the closed circuit position, and a common means for actuating said switch member and said contact means, said common actuating means, during the circuit opening operation, causing said contact means to move relative to said switch member with not more than a slight movement of the switch member and then causing said switch member to move relative to said contact means.

25. An electric switch including a switch member, a contact means adapted to be engaged thereby, and for rotating said switch member means and said contact means, the axis of rotation of said contact means lying substantially in the same plane as the plane in which said switch member is rotated.

26. In an electric switch, a rotatable contact means having contact surfaces parallel to its axis of rotation, a switch member for cooperating therewith to open and to close the circuit, and operating means for said switch comprising means actuable during the circuit opening operation to rotate said contact means, in order to loosen the engagement between said means and said switch member while the switch member is maintained substantially stationary, and to move said switch member to the open circuit position after its engagement with said contact means has been loosened.

27. In an electric switch, a rotatable contact means, a switch member for cooperating therewith to open and close the circuit, means supporting said switch member for swingable movement in a plane substantially parallel to the axis of rotation of said rotatable contact means, and operating means for said switch comprising means actuable during the circuit opening operation to rotate said contact means while said switch member is maintained substantially stationary and to then swingably move said switch member to the open circuit position.

28. An electric switch including a rotatable contact tongue having contact portions on opposite sides of the axis of rotation thereof, a cooperating contact jaw movable into engagement with said contact portions of the contact tongue, and means for opening said switch, including means for rotating said contact tongue in said contact jaw to loosen engagement therewith while said contact jaw is maintained substantially stationary and then moving said contact jaw to the open circuit position.

29. An electric switch including a rotatable contact means having contact portions on opposite sides of the axis of rotation thereof, a cooperating contact means swingably movable into engagement with said contact portions, and means for opening said switch, including means for rotating said rotatable contact means to disengage said cooperating contact means while said cooperating contact means is moved only a small amount and then swinging said cooperating means to the open circuit position.

30. An electric switch including a pair of rotatable insulators, a contact means mounted on one of said insulators and including contact portions on opposite sides of the axis of rotation thereof, cooperating contact means mounted on the other of said insulators, and having means for establishing engagement with said contact portions of said contact member on opposite sides of the axis of rotation of the contact member, and actuating means for moving said switch to the open and to the closed circuit position, said actuating means including means for rotating one of said insulators while holding the other of said insulators substantially stationary and for then rotating the other of said insulators.

31. An electric switch including a pair of cooperating contacts each of which is movable and is mounted on an insulator column, the axes of which lie in the same plane, and an operating mechanism effective by a continuous motion to actuate one contact while the other contact is maintained substantially stationary and to then actuate said other contact.

32. An electric switch including a support, a rotatable bearing mounted thereon, an insulator mounted on the rotatable portion of the bearing, a switch member mounted on the insulator and rotated thereby, a bearing mounted on the support and spaced from the first mentioned bearing, an insulator mounted on the rotatable element of the last mentioned bearing, a contact mounted on the last mentioned insulator and adapted to be engaged by the switch member, and means for rotating the contact and the switch member to open the switch, said means rotating said contact while the switch member is maintained substantially stationary and then rotating said switch member.

33. An electric switch including a supporting base, a rotatable bearing mounted thereon, an insulator mounted on the rotatable portion of the bearing, a switch member mounted on the insulator and rotated thereby, a spaced bearing mounted on the base opposite the first mentioned bearing, an insulator mounted on the rotatable element of the last mentioned bearing, and a contact mounted on the last mentioned insulator and adapted to be engaged by the switch member, the contact including contacting portions on the opposite sides of the axis of rotation thereof, and said switch member including contacting members for engaging both of the contacting portions of the contact.

34. An electric switch including a supporting base, a rotatable bearing mounted thereon, an insulator mounted on the rotatable portion of the bearing, a switch member mounted on the insulator and rotated thereby, a spaced bearing mounted on the base opposite the first mentioned bearing, an insulator mounted on the rotatable element of the last mentioned bearing, a contact mounted on the last mentioned insulator and adapted to be engaged by the switch member, means for rotating the first mentioned insulator, and a link-work extending from the rotating mechanism for rotating the other insulator, said link-work including a crank adjacent the last mentioned insulator and a link for rotating the crank, said link making an angle substantially greater than 90° with the crank when the switch is in the closed position.

35. An electric switch including a supporting base, a rotatable bearing mounted thereon, an insulator mounted on the rotatable portion of the bearing, a switch member mounted on the insulator and rotated thereby, a spaced bearing mounted on the base opposite the first mentioned bearing, an insulator mounted on the rotatable element of the last mentioned insulator and having a contact adapted to be engaged by the switch member, the contact including contacting portions on the opposite sides of the axis of rotation thereof, and said switch member including contacting members for engaging both of the contacting portions of the contact, means for rotating the first mentioned insulator, and a link-work extending from the rotating mechanism for rotating the other insulator, said link-work including a crank adjacent the last mentioned insulator and a link for rotating the crank, said link making an angle substantially greater than 90° with the crank when the switch is in the closed position.

36. An electric switch including a supporting base, a rotatable bearing mounted thereon, an insulator mounted on the rotatable portion of the bearing, a switch member mounted on the insulator and rotated thereby, a spaced bearing mounted on the base opposite the first mentioned bearing, an insulator mounted on the rotatable element of the last mentioned bearing, a contact mounted on the last mentioned insulator and adapted to be engaged by the switch member and means for rotating the contact while the switch member is maintained substantially stationary and then moving the switch member away from the contact to open the switch.

37. An electric switch including a supporting base, a rotatable bearing mounted thereon, an insulator mounted on the rotatable portion of the bearing, a switch member mounted on the insulator and rotatable thereby, a spaced bearing mounted on the base opposite the first mentioned bearing, an insulator mounted on the rotatable element of the last mentioned bearing, a contact mounted on the last mentioned insulator adapted to be engaged by the switch member, and means for rotating the contact and the switch member to open the switch, said means including connections permitting the switch member to remain substantially stationary during a predetermined portion of the switch opening movement of the contact.

38. An electric switch including a supporting base, a rotatable bearing mounted thereon, an insulator mounted on the rotatable portion of the bearing, a switch member mounted on the insulator and rotated thereby, a spaced bearing mounted on the base opposite the first mentioned bearing, an insulator mounted on the rotatable element of the last mentioned bearing, a contact mounted on the last mentioned insulator and adapted to be engaged by the switch member, the contact including contacting portions on the opposite sides of the axis of rotation thereof, and said switch member including contacting members for engaging both of the contacting portions of the contact, and means for rotating both the contact and the switch member to open the switch, said means causing a large part of the rotation of the contact before there is much rotation of the switch member.

39. An electric switch including a supporting base, a rotatable bearing mounted thereon, an insulator mounted on the rotatable portion of the bearing, a switch member mounted on the insulator and rotated thereby, a spaced bearing mounted on the base opposite the first mentioned bearing, an insulator mounted on the rotatable element of the last mentioned bearing and having a contact adapted to be engaged by the switch member, the contact including contacting portions on the opposite sides of the axis of rotation thereof, and said switch member including contacting members for engaging both of the contacting portions of the contact, and means for rotating the contact and the switch member to open the switch, said means causing the switch member to remain substantially stationary during a predetermined substantial portion of the switch opening movement of the contact.

40. A switch including a movable switch member, a contact at the end thereof, a second contact adapted to be engaged by the first contact and be wedged into firm engagement therewith, an insulator stack supporting the second contact, means for actuating the second contact to loosen the engagement between the two while the switch member is maintained substantially stationary, and means for thereafter swinging said switch member away from said second contact in a direction initially substantially axially of the insulator stack.

HERBERT J. CRABBS.